United States Patent
Stocco et al.

(10) Patent No.: US 12,546,223 B2
(45) Date of Patent: Feb. 10, 2026

(54) VARIABLE RIM WIDTH TURBINE BLADE ATTACHMENT

(71) Applicant: PRATT & WHITNEY CANADA CORP., Longueui (CA)

(72) Inventors: Thierry Stocco, Longueuil (CA); Othmane Leghzaouni, Boucherville (CA); Robert Huszar, Saint-Bruno-de-Montarville (CA); Daniel Lecuyer, St-Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 103 days.

(21) Appl. No.: 18/540,247

(22) Filed: Dec. 14, 2023

(65) Prior Publication Data
US 2025/0198291 A1    Jun. 19, 2025

(51) Int. Cl.
*F01D 5/14* (2006.01)
*F01D 5/30* (2006.01)

(52) U.S. Cl.
CPC .......... *F01D 5/147* (2013.01); *F01D 5/3007* (2013.01); *F05D 2220/32* (2013.01)

(58) Field of Classification Search
CPC ........ F01D 5/3007; F01D 5/141; F01D 5/147; F01D 5/143; F01D 5/225; F05D 2220/32; F05D 2240/80
See application file for complete search history.

(56) References Cited

U.S. PATENT DOCUMENTS

| | | | |
|---|---|---|---|
| 6,019,580 A * | 2/2000 | Barr | F01D 5/3007 416/193 A |
| 6,769,877 B2 | 8/2004 | Martin et al. | |
| 6,857,853 B1 | 2/2005 | Tomberg et al. | |
| 9,212,663 B2 * | 12/2015 | O'Neill | F01D 5/141 |
| 9,359,905 B2 | 6/2016 | Lamicq et al. | |
| 10,781,703 B2 | 9/2020 | Ahmad et al. | |
| 2008/0101939 A1 | 5/2008 | Zemitis et al. | |
| 2009/0208339 A1 | 8/2009 | Cherolis et al. | |
| 2009/0297351 A1 | 12/2009 | Brahmasuraih | |
| 2011/0027091 A1 | 2/2011 | Clemen | |
| 2023/0167744 A1 | 6/2023 | Song et al. | |
| 2024/0209743 A1* | 6/2024 | Lawniczek | F01D 5/147 |

FOREIGN PATENT DOCUMENTS

CA   2595849 A1   2/2008
CA   3051902 A1   4/2020

OTHER PUBLICATIONS

Extended European Search Report for European patent application No. 24219991.7, dated May 12, 2025, 8 pages.

* cited by examiner

*Primary Examiner* — Courtney D Heinle
*Assistant Examiner* — Andrew Thanh Bui
(74) *Attorney, Agent, or Firm* — Kinney & Lange, P.A.

(57) ABSTRACT

A rotor assembly includes a disk and a blade. The disk is rotatable about an axis that includes a plurality of slots distributed circumferentially along an outer periphery of the disk. The blade includes an airfoil and a root extending radially inward from the airfoil that is received in one of the slots. The disk and the root have an axial widths that define a variable rim width profile. The variable rim width profile includes a minimum rim width disposed radially outward from a bottom lobe of the root.

11 Claims, 5 Drawing Sheets

VARIABLE RIM WIDTH TURBINE BLADE ATTACHMENT

BACKGROUND

The present disclosure relates generally rotor assemblies, and more particularly, to mechanically efficient blade attachments.

In order to produce work and/or thrust, gas turbine engines use one or more compressor stages to pressurize airflow received at an inlet, add heat energy to the pressurized airflow through combustion, and expand the heated and pressurized airflow across one or more turbine stages. Mechanically inefficient blade attachments increase rotor weight, negatively impacting the maximum rotational speed and/or work capacity of the rotor assembly. Additional blade and/or disk weight can increase blade attachments and disk sections radially to achieve a target work capacity, which is not always possible for some compact rotor assemblies.

SUMMARY

A rotor assembly for a gas turbine includes a disk and a blade. The disk is rotatable about an axis that includes a plurality of slots distributed circumferentially along an outer periphery of the disk. The blade includes an airfoil and a root extending radially inward from the airfoil that is received in one of the slots. The disk and the root have axial widths that define a variable rim width profile. The variable rim width profile includes a minimum rim width disposed radially outward from a bottom lobe of the root.

DETAILED DESCRIPTION

Figure 1:
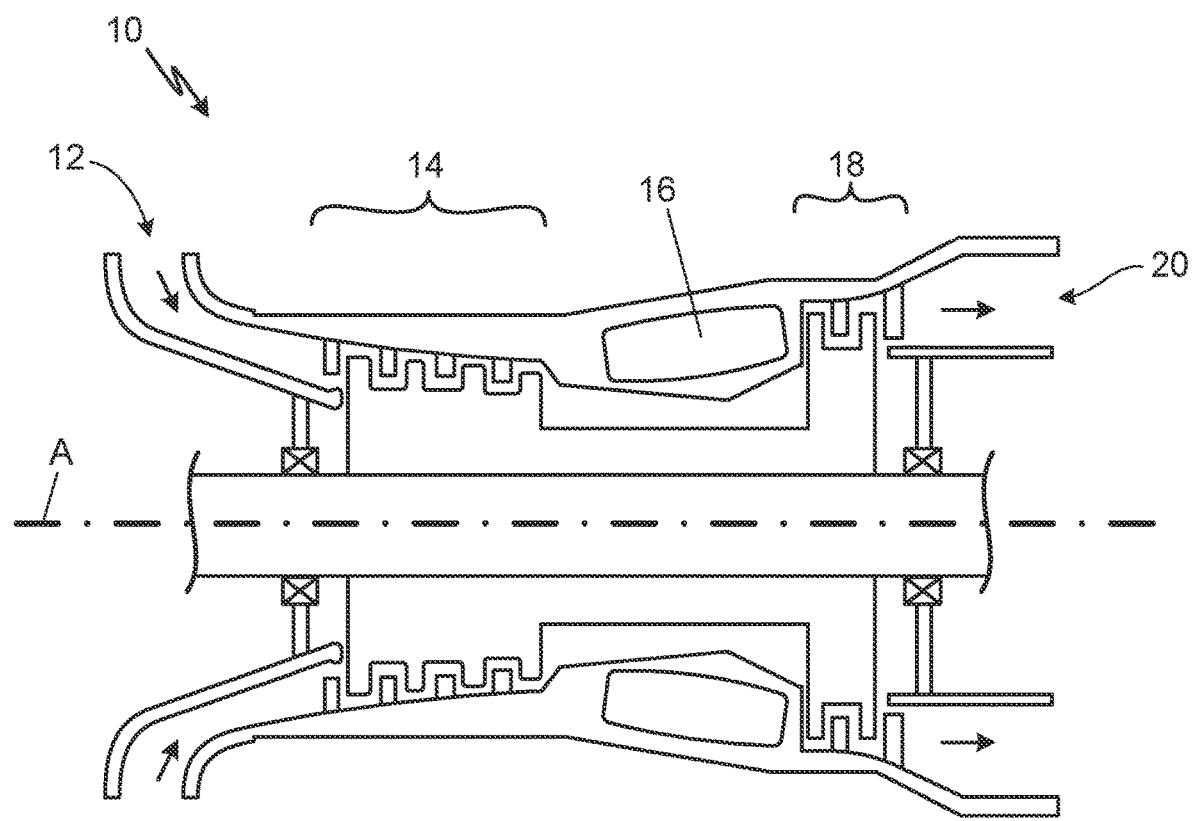
FIG. 1 is a schematic view of an example gas turbine engine cross section.

FIG. 1 is a schematic cross-sectional view of gas turbine engine 10, which is depicted with single spool architecture. In other examples, gas turbine engine 10 can be configured with two spools (e.g., a dual-spool architecture), or more than two spools (e.g., a power turbine or a topping cycle spool non-concentrically arranged with respect to one or more primary spools). Gas turbine engine 10 can be configured as a propulsion engine, for example, a turbofan engine, a turboprop engine, and/or a turboshaft engine. In other examples, gas turbine engine 10 can be an industrial gas turbine engine driving a load (e.g., an electric machine). The architecture of gas turbine engine 10 depicts a forward-to-aft main gas flow path in which the engine ingests air into a forward portion of the engine that flows aft through the compressor section, the combustor, and the turbine section before discharging from an aft portion of the engine. In other examples, gas turbine engine 10 can have a reverse-flow architecture in which the engine ingests air into an aft portion of the engine that flows forward through the compressor section, the combustor, and the turbine section before discharging through an exhaust at a forward portion of the engine. Other examples of gas turbine engine 10 can have more stages or less stages than the number of compressor stages and/or turbine stages depicted by FIG. 1.

As depicted in FIG. 1, gas turbine engine 10 includes, in serial flow communication, air inlet 12, compressor section 14, combustor 16, turbine section 18, and exhaust section 20. Compressor section 14 pressurizes air entering gas turbine engine 10 through air inlet 12. The pressurized air discharged from compressor section 14 mixes with fuel inside combustor 16. Igniters initiate combustion of the air-fuel mixture within combustor 16, which is sustained by a continuous supply of fuel and pressurized air. A heated and compressed air stream discharges through turbine section 18 and exhaust section 20. Turbine section 18 extracts energy from exhaust stream to drive compressor section 14 and other engine accessories such electrical generators and pumps for lubrication, fuel, and/or actuators.

Compressor section 14 and turbine section 18 each include one or more stages, each stage including at least one row of circumferentially spaced stationary vanes paired with at least one row of circumferentially spaced rotor blades. Rotor blades of compressor section 14 and/or turbine section 18 can be attached to a disk by a root received within a slot of the disc, and the disk can be mounted to a shaft for rotation therewith. The root can be a fir tree attachment in which multiple lobe pairs protrude from a central body of the blade attachment to engage corresponding lobes protruding into the slot from the disk. In other examples, the root can have a dovetail configuration, among other possible configurations.

In operation, rotor assemblies of compressor section 14 and turbine section 18 rotate about axis A, imposing centrifugal and aerodynamic loads on the roots, which are transferred to the disk at the slots. Optimum design of the rotor assembly includes maximum utilization of the blade and disk material for one or more limiting operating conditions of gas turbine engine 10. Utilization of the rotor assembly can be evaluated using one or more limiting stress locations of the blade, the blade attachment (i.e., the root and/or teeth), and/or the disk. For example, limiting stress locations of the blade root can include, but are not limited to, body stress at a neck section of the blade root, bearing stress on a contact surface of one or more lobes, shear stress through one or more lobes, and/or bending stress of one or more lobes. Limiting stress locations of the disk can include body stress at a neck section of the disk tooth, bearing stress of a contact surface of one or more disk lobes, shear stress through one or more disk lobes, bending stress of one or more disk lobes, and/or a hoop stress of the disk.

Figure 2:
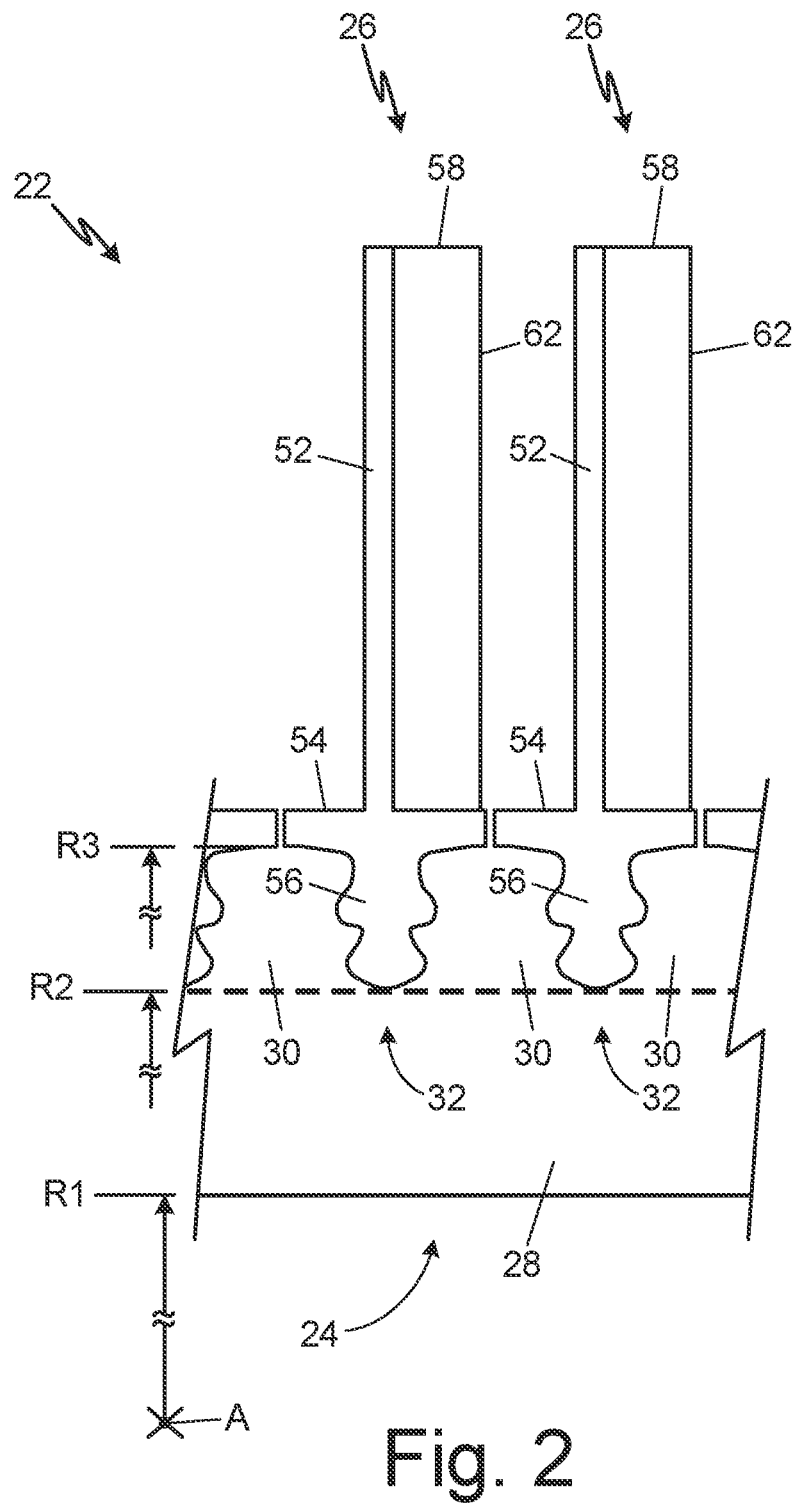
FIG. 2 is a developed schematic view an example rotor assembly.
Figure 3:
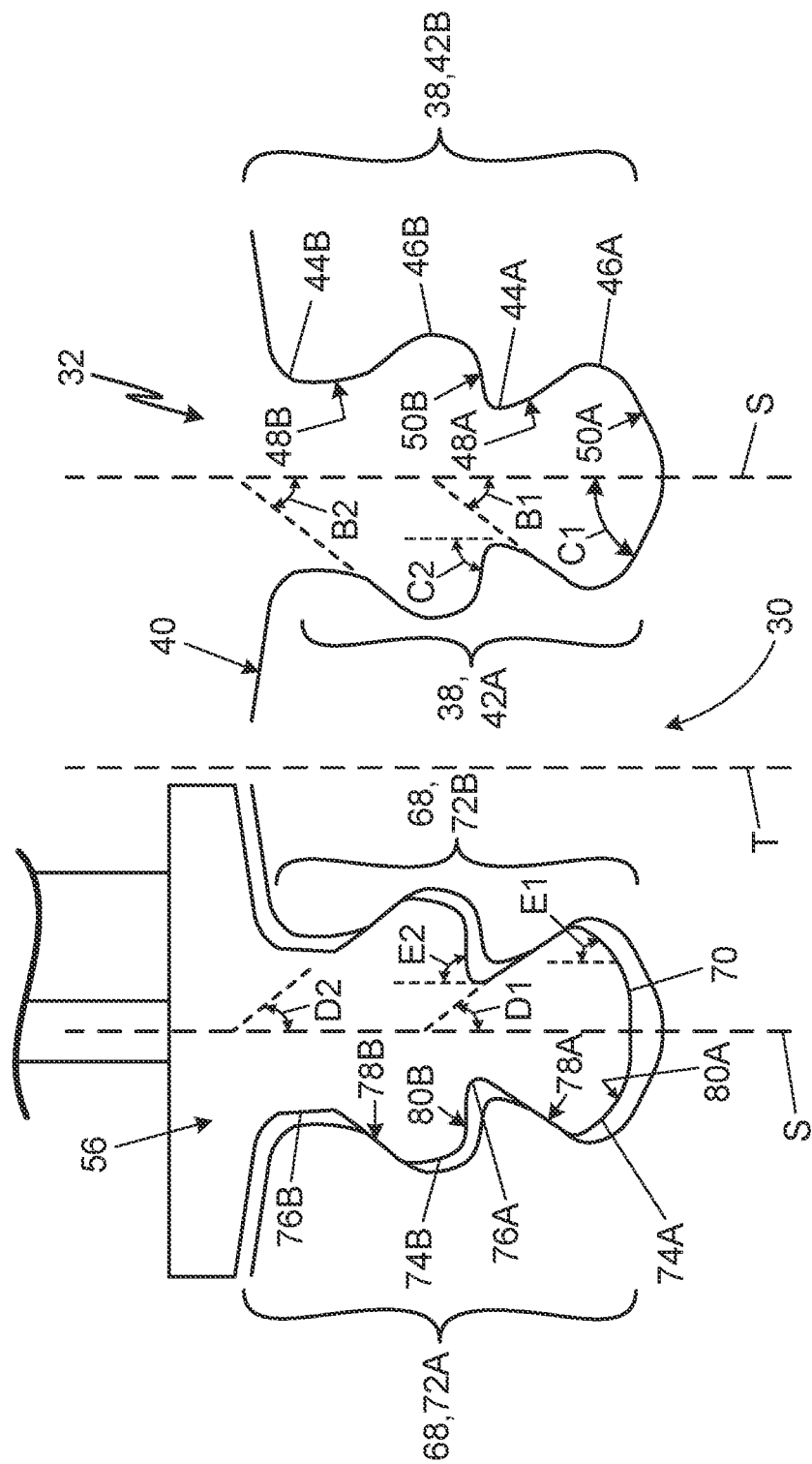
FIG. 3 is an enlarged view of the blade attachment and slot of the example rotor assembly.
Figure 4:
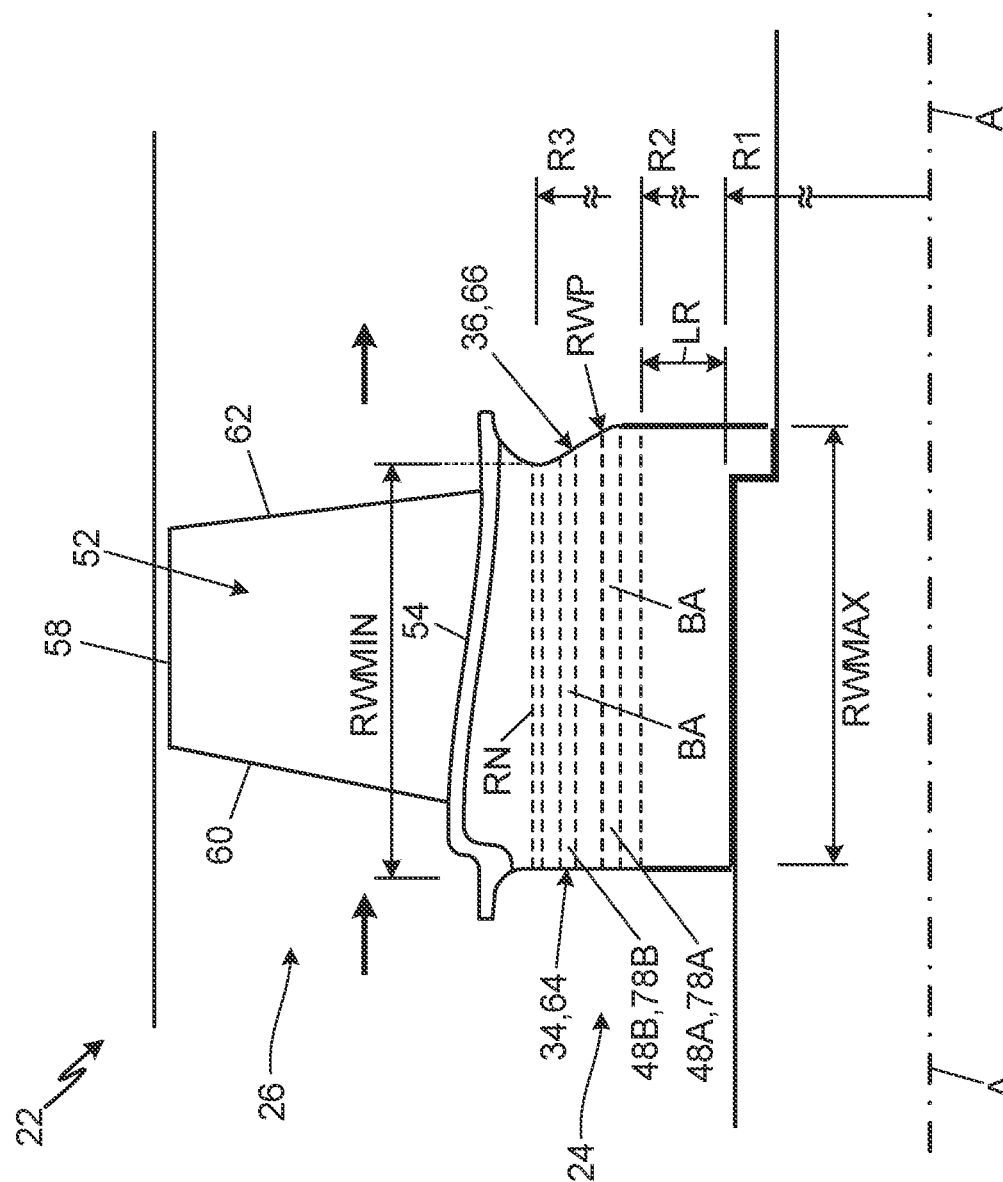
FIG. 4 is a side view of the example rotor assembly depicting a variable rim width profile.
Figure 5:
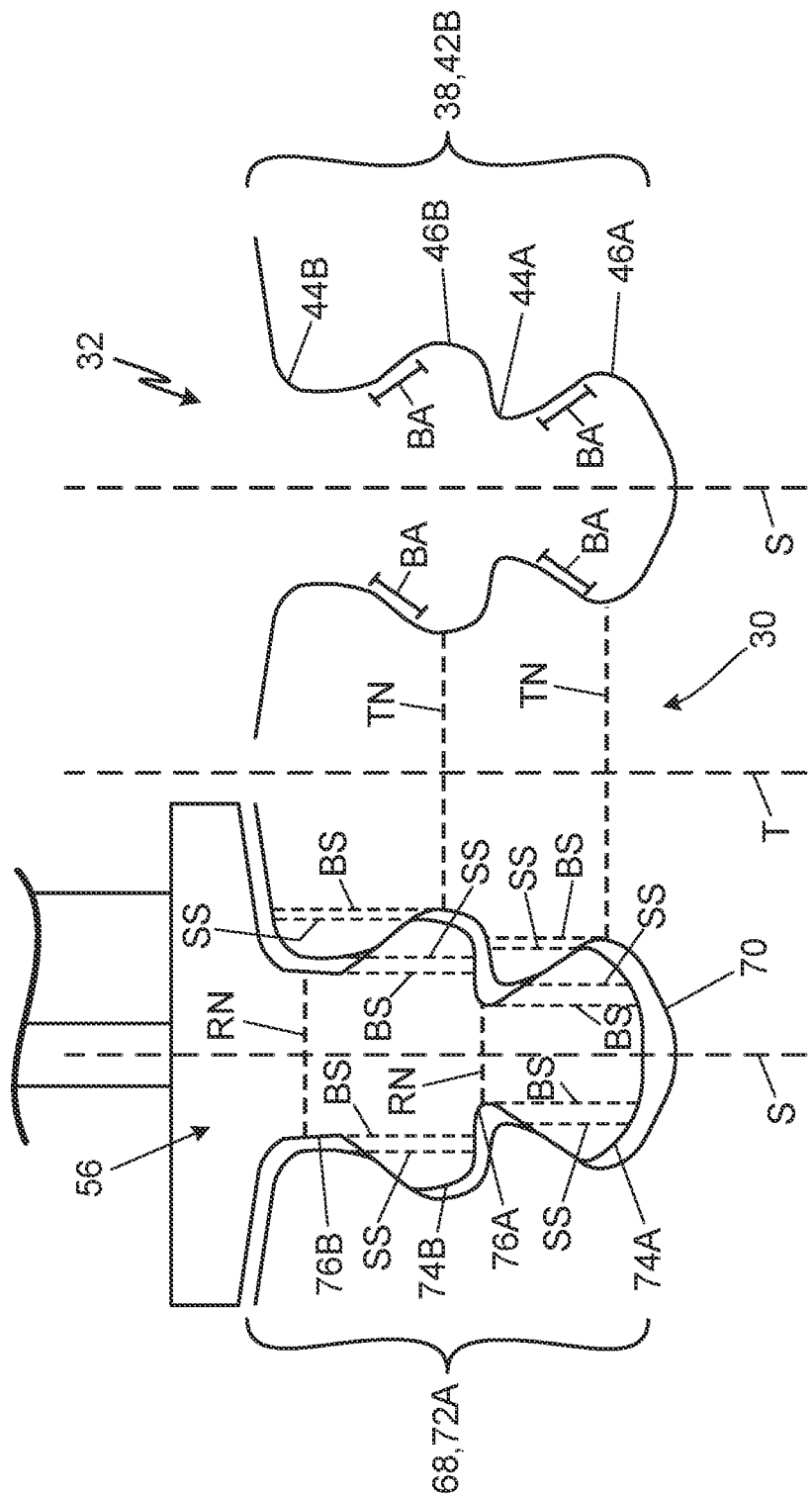
FIG. 5 is an enlarged view of the blade attachment and slot depicting key stress evaluation locations.

FIG. 2 is developed schematic view depicting a sector of rotor assembly 22, which can be utilized by compressor section 14 and/or turbine section 18. FIG. 3 is an enlarged view of the blade attachment illustrating the blade attachment with and without a blade. FIG. 4 is a side view of example rotor assembly 22. FIG. 5 is an enlarged view of the blade attachment illustrating potential limiting stress locations. FIG. 2, FIG. 3, FIG. 4, and FIG. 5 are discussed together below.

Rotor assembly 22 includes disk 24 and a circumferential array of blades 26, of which only two blades 26 are depicted by FIG. 2. It shall be understood that features of rotor assembly 22 described herein, in particular details of blade 26 or slot 32, apply to each blade 26 and slot 32 of rotor assembly 22. Features of disk 24 and blade 26 are described below in reference to slot datum S and tooth datum T. Slot datum S and tooth datum S are imaginary lines extending radially through axis A of gas turbine engine 10 that bisects slot 32 of disk 24, in the case of slot datum S, and bisects tooth 30, in the case of tooth datum T.

Disk 24 includes body portion 28, teeth 30, and slots 32. Body portion 28 extends from inner disk radius R1 to live rim radius R2, which represents the maximum radius at which disk 24 is uninterrupted by slots 32 and capable of supporting a circumferential load (i.e., hoop load). Teeth 30 extend from live rim radius R2 to outer disk radius R3, which forms an outer periphery of disk 24. Slots 32 are formed between circumferentially adjacent teeth 30 and are equally spaced about axis A. Slots 32 extend axially through disk 24 and extend radially along slot datum S to intersect outer disk radius R3.

Teeth 30 include forward surfaces 34, aft surfaces 36, as shown by FIG. 4, as well as tooth flanks 38A-38B, and outer ends 40, as shown by FIG. 3. Each tooth 30 extends radially outward from live rim radius R2 to respective outer ends 40 at outer radius R3 of disk 24, and axially between respective forward surfaces 34 and aft surfaces 36 as depicted by FIG. 4. The circumferential sides of teeth 30 are bound by tooth flanks 38, which include slot serration profiles 42A-42B. Circumferentially adjacent teeth 30 define slots 32. A distance between forward surface 34 and aft surface 36 defines an axial width of disk 24 (i.e., disk width DW), which is measured parallel to axis A (i.e., an axial direction) and may vary with radial station of disk 24 in a manner described below.

Tooth flanks 38 include slot serration profiles 42A-42B, respectively, which form an undulating profile comprising one or more slot lobes and one or more slot troughs disposed between radially adjacent slot lobes, or between a radially inner most of slot lobes and inner end face of slot 32. In the example depicted by FIG. 3, serration profile 42 includes two slot lobes (e.g., lobes 44A and lobes 44B) and two slot troughs (e.g., troughs 46A and 46B). Slot lobes 44A-44B include respective restraint surfaces 48A-48B and relief surfaces 50A-50B. Restraint surfaces 48A-48B are radially inward facing, and relief surfaces 50A-50B are radially outward facing, each orientated at an oblique angle to slot datum S. Restraint angles B1 and B2 are acute angles between respective restraint surfaces 48A-48B and slot datum S. Relief angles C1 and C2 are acute angles between respective relief surfaces 50A-50B and slot datum S. Restraint surfaces 48A-48B and relief surfaces 50A-50B are interconnected by transition surfaces, which may be defined by a constant or variable radius, multiple discrete radii, a blunt or planar surface, and/or other suitable transition. Suitable transition surfaces provide clearance to corresponding surfaces of root flanks 68 and produce acceptable stress concentrations within teeth 30 during operation of gas turbine engine 10.

Blade 26 includes airfoil 52, platform 54, and root 56. Airfoil 52 extends in a spanwise direction from platform 54 to tip 58 within a gas path of gas turbine 10 and in a chordwise direction from leading edge 60 to trailing edge 62. Flanks of airfoil 52 are bound by a pressure side surface and a suction side surface. Platform 54 forms a circumferential segment of the gas path. Root 56 extends radially inward from platform 54 to be received within one of slots 32 of disk 24.

Root 56 includes LE axial surface 64, TE axial surface 66, root flanks 68, and inner end 70. Root 56 extends radially inward along slot datum S from platform 54 to inner end 70. Axial ends of root 56 are bound by LE axial surface 64 coinciding with a leading edge of blade 26 and TE axial surface 66 coinciding with trailing edge of blade 26. Circumferential sides of root 56 are bound by root flanks 68, which include serration profiles that are symmetric about slot datum S. A distance between LE axial surface 64 and TE axial surface 66 measured parallel to engine axis (i.e., an axial direction) defines an axial width of root 56 (i.e., root width RW), which may vary with radial station of root 56 in a manner described below.

Root flanks 68 include root serration profiles 72A-72B, respectively, which form an undulating profile complimentary to slot serration profiles 42A-42B. Root serration profiles 72A-72B include one or more lobes and one or more troughs disposed between radially adjacent lobes, or between a radially outermost of lobes and platform 54. As shown, serration profiles 72A-72b includes lobes 74A-74B and troughs 76A-76B. Lobes 74A-74B include respective contact surfaces 78A-78B and non-contact surfaces 80A-80B. Contact surfaces 78A-78B are radially outward facing, and non-contact surfaces 80A-80B are radially inward facing, each orientated at an oblique angle to slot datum S. Contact angles D1-D2 are acute angles between respective contact surfaces 78A-78B and slot datum S. Non-contact angles E1-E2 are acute angles between respective non-contact surfaces 80A-80B and slot datum S. Contact surfaces 78A-78B and non-contact surfaces 80A-80B are interconnected by transition surfaces, which may be defined by a constant or variable radius, multiple discrete radii, a blunt or planar surface, and/or other suitable transition. Suitable transition surfaces provide clearance to corresponding surfaces of tooth flanks 38 and produce acceptable stress concentrations within root 56 during operation of gas turbine engine 10.

Root 56 includes at least one lobe pair formed by lobes 74A-74B on either root flank 68. Although root 56 can include two lobe pairs in some examples, or more than two lobe pairs in other examples. Tooth 30 includes an equal number of lobe pairs, each tooth lobe pair configured to engage a corresponding lobe pair of root 56. In the example depicted by FIG. 3, root 56 includes bottom lobes 74A and top lobes 74B, which form a bottom lobe pair and a top lobe pair respectively. Bottom lobes 74A are the radially inner most lobes of root 56 and top lobes 74B are the radially outermost lobes of root 56.

In an assembled position depicted by FIG. 2 and FIG. 3, slot 32 receives root 56 of blade 26. Contact surfaces 78A-78B mate with corresponding restraint surfaces 48A-48B of teeth 30. Non-contact surfaces 78A-78B and corresponding relief surfaces 50A-50B define clearance between root 56 and teeth 30. Rotor assembly 22 can include a biasing member disposed between root 56 and disk 24 that biases contact surfaces 78A-78B into contact with restraint surfaces 48 when rotor assembly 22 is at rest. While FIG. 2 and FIG. 3 illustrate only two teeth 30, it is understood that disk 24 includes a plurality of teeth 30, each tooth 30 of the plurality of teeth 30 including features described in reference to each of tooth 30A and tooth 30B, and each pair of circumferentially adjacent teeth 30 defining slots 32 which are adapted to receive root 56 of blade 26.

During operation of gas turbine engine 10, rotor assembly 22 rotates about axis A imposing a net load on blade 26. The net load includes centrifugal force acting in a radially outward direction and having a magnitude proportional to the rotational speed of rotor assembly 22 and mass distribution of blade 26. Aerodynamic loading imposed on blade 26 also contributes to the net blade load which contributes to twisting moment and/or bending moment imposed on blade 26. Other operational loads can include vibrational perturbations and/or thermal loads, which can further contribute to the net load. Generally, the net load primarily acts in a radially outward direction on blade 26 but also includes a twisting moment and/or a bending moment that is reacted at root 56 and supported by disk 24.

While stress within rotor assembly 22 can be evaluated at any location or section extending therethrough, mechanical performance rotor assembly 22 can be characterized by evaluating stress at one or more potentially limiting locations within root 56, tooth 30, and/or disk 24. As shown in FIG. 5, root 56 includes one or more root neck sections RN defined as a section normal to slot datum S and located at local minimum cross-sectional area of root 56, such as a section intersecting one of troughs 76A-76B. Tooth 30 includes one or more tooth neck sections TN defined as a section normal to tooth datum T and located at local minimum cross-sectional area of tooth 30. Root lobes 74A-74B and tooth lobes 44A-44B include bearing areas BA defined as the cross-sectional area of respective contact surfaces 78A-78B in contact with restraint surfaces 48A-48B. Root lobes 74A-74B and tooth lobes 44A-44B further include shear sections SS and bending sections BS. Shear sections SS define sections parallel to slot datum S, in the case of root lobes 74A-74B, or parallel to tooth datum T, in the case of tooth lobes 44A-44B, that intersect respective lobes at a location of maximum shear stress. Bending sections BS define cross-sections parallel to slot datum S, in the case of root lobes 74A-74B, or parallel to tooth datum T, in the case of tooth lobes 44A-44B, that intersect respective lobes at a location of maximum bending stress. As shown in FIG. 4, disk 24 includes live rim section LR defined by the cross-sectional area extending radially from inner diameter R1 of disk 24 to live rim diameter R2 of disk 24 and extending axially between forward surface 34 and aft surface 36. Optimal mechanical performance of rotor assembly 22 can be achieved by minimizing a difference between a limit stress and a design stress at each of one or more limiting locations of the root 56, tooth 30, and/or disk 24. By configuring each section to be only as strong as necessary to safely carry the net load of each blade 26, excess weight of rotor assembly 22 is minimized.

FIG. 4 is a side view of example rotor assembly 22. Blade 26 is depicted with airfoil 52, platform 54, and root 56. LE axial surface 64 and TE axial surface 66 of root 56 are shown along with additional root details shown with hidden lines including bottom lobe 74A and top lobe 74B and associated contact surfaces 78A-78B. Disk 24 is depicted with forward surface 34, aft surface 36, outer radius R3, and live rim radius R2. Neck section TN of root 56, bearing sections BS of bottom lobe 74A and top lobe 74B, and live rim section LR of disk 24 are shown.

Root width RW and disk width DW vary along a radial direction between outer radius R3 of disk 24 and inner end 70 of root 56 to define rim width profile RW. Root width RW and disk width DW vary coincidentally such that, at the same radial station, root width RW conforms to disk width DW. For some examples, rim width RW may define profiles along LE axial surface and TE axial surface that are offset from respective profiles of forward surface and aft surface defined by rotor width RW. In some examples, root width RW is approximately equal to and coincident to disk width DW as a function of radius. That is to say, root width RW may not be exactly equal to disk width DW, but has a dimension that is within manufacturing tolerances and assembly tolerances of blade 26, disk 24, and rotor assembly 22.

The combined profiles of root width RW and disk width DW define rim width profile RWP, which may include increasing rim width portions, decreasing rim width portions, and/or constant rim width portions. Increasing and/or decreasing rim width portions can include linearly increasing or decreasing portions. In other examples, increasing and/or decreasing rim width portions can be described by a second order, or higher order polynomial relationship, exponential relationship, or other mathematic relationship.

In some examples, rim width profile RWP includes a minimum rim width RWMIN at a radial station between bottom lobe 74A and platform 54. In other examples, minimum rim width RWMIN is at a radial station between bottom lobe 74A and outer radius R3. In yet another example, minimum rim width RWMIN coincides with neck section RN radially outward from top lobe 74B and radially inward from platform 54. In each of the foregoing examples, rim width profile RWP increases from minimum disk width RWMIN in a radially inward direction towards bottom lobe 74A. Increased rim width at bottom lobe 74A allows neck section NS, bearing section BS, shear section SS, and bearing section BS at or near top lobe 74A can be reduced without exceeding stress limits for respective sections. Moreover, increasing rim width profile RWP towards and, in some cases, up to bottom lobe 74A allows optimization of neck section NS, bearing section BS, shear section SS, and bending section BS proximate bottom lobe 74A. Optimization of each section in proximity to bottom lobe 74A permits two lobes (e.g., top lobe 74B and bottom lobe 74A) to fully support blade 26 within slot 32 rather than resorting to three-lobe designs, or higher number of lobe designs.

As depicted in FIG. 4, rim width profile RWP increases in a radially outward direction from minimum rim width RWMIN coincident with top lobe neck section RN to bottom lobe 74A. A maximum rim width RWMAX is coincident with a midsection of bottom lobe bearing section BS. Extending radially inward from RWMAX, rim width profile RWP remains constant to at least live rim radius R2, and may remain constant for the remainder of disk 24 except for local features of disk 24 that do not significantly decrease mechanical performance of disk 24. In a region local to RWMIN, rim width profile RWP can define a concave profile defined by a constant radius, as shown by FIG. 4, a variable or stepped radius in other examples. Rim width profile RWP extends radially outward from RWMIN to join platform 54 and, may have an increasing profile between minimum rim width RWMIN to platform 54. Extending radially inward from minimum rim width RWMIN, rim width profile RWP increases along a linear portion. In some examples, the linear portion of rim width profile forms an angle with slot datum S between thirty degrees and forty-five degrees, or between forty degrees and forty-five degrees in other examples.

Rim width profile RWP provides further benefits to disk 24 including reduced tooth 30 height coinciding with a reduced height of root 56. Root and tooth profiles optimized in this manner permit live rim radius R2 to be larger than three-lobe designs, or higher number of lobe designs. Accordingly, body portion 28 can be optimized without exceeding stress limits of live rim section LR. In total, the radial envelope of rotor assembly 22 can be reduced for a given load capacity, or the load capacity of rotor assembly 22 can be increasing for a given radial envelope.

Discussion of Possible Embodiments

The following are non-exclusive descriptions of possible embodiments of the present invention.

Rotor Assembly with Variable Rim Width Profile

A rotor assembly for a gas turbine engine according to an exemplary embodiment of this disclosure includes, among other possible things, a disk and a blade. The disk is rotatable about an axis and includes a plurality of slots. The plurality of slots are distributed circumferentially about a radially outer periphery of the disk. Each slot includes an inner lobe pair disposed at the radially inboard end thereof. The blade includes an airfoil and a root joined to the airfoil. The root is received within one of the plurality of slots. The root includes a bottom lobe pair mated with the inner lobe pair of the disk. An axial width of the disk conforms to an axial width of the root to define a variable rim width profile that includes a minimum rim width disposed between the bottom lobe pair and the outer periphery of the disk.

The rotor assembly of the preceding paragraph can optionally include, additionally and/or alternatively, any one or more of the following features, configurations and/or additional components.

A further embodiment of the foregoing rotor assembly, wherein the rim width profile can increase from the minimum rim width to the bottom lobe pair.

A further embodiment of any of the foregoing rotor systems, wherein the blade can include a root neck section normal to the radial direction with a local minimum cross-sectional area.

A further embodiment of any of the foregoing rotor systems, wherein the minimum rim width can coincide with the root neck section.

A further embodiment of any of the foregoing rotor systems, wherein the disk can include an outer lobe pair disposed radially outward from the inner lobe pair.

A further embodiment of any of the foregoing rotor systems, wherein the root can include a top lobe pair mated with the outer lobe pair of the disk.

A further embodiment of any of the foregoing rotor systems, wherein the rim width profile can increase from the top lobe pair to the bottom lobe pair.

A further embodiment of any of the foregoing rotor systems, wherein the rim width profile can include a radius at the minimum rim width.

A further embodiment of any of the foregoing rotor systems, wherein the rim width profile can include a linear portion tangent to the radius and extending towards the bottom lobe pair.

A further embodiment of any of the foregoing rotor systems, wherein the linear portion can form an angle with the radial direction between thirty degrees and forty-five degrees.

A further embodiment of any of the foregoing rotor systems, wherein the variable rim width profile includes a maximum rim width.

A further embodiment of any of the foregoing rotor systems, wherein the variable rim width profile can increase from the minimum rim width radially inward to the maximum rim width.

A further embodiment of any of the foregoing rotor systems, wherein the maximum rim width can coincide with the bottom lobe.

A further embodiment of any of the foregoing rotor systems, wherein the maximum rim width can coincide with a midspan of a contact surface of the bottom lobe.

A further embodiment of any of the foregoing rotor systems, wherein the variable rim width can include a constant rim width portion radially inward from the maximum rim width.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rotor assembly comprising:
   a disk rotatable about an axis comprising:
      a plurality of slots distributed circumferentially about a radial outer periphery of the disk, wherein each slot includes an inner lobe pair disposed at the radially inboard end thereof and an outer lobe pair disposed radially outward from the inner lobe pair; and
   a blade comprising:
      an airfoil; and
      a root joined with the airfoil and received within one of the plurality of slots, the root comprising:
         a bottom lobe pair mated with the inner lobe pair of the disk; and
         a top lobe pair mated with the outer lobe pair of the disk;
   wherein an axial width of the disk conforms with an axial width of the root to define a variable rim width profile that includes a minimum rim width disposed between the bottom lobe pair and the outer periphery of the disk; and
   wherein the rim width profile increases from the top lobe pair to the bottom lobe pair; and
   wherein the rim width profile includes a radius at the minimum rim width and a linear portion tangent to the radius extending towards the bottom lobe pair; and
   wherein the linear portion forms an angle with the radial direction between thirty degrees and forty-five degrees.

2. The rotor assembly of claim 1, wherein the rim width profile increases from the minimum rim width to the bottom lobe pair.

3. The rotor assembly of claim 2, the blade further comprising a root neck section normal to the radial direction with a local minimum cross-sectional area, wherein the minimum rim width coincides with the root neck section.

4. A rotor assembly comprising:
   a disk rotatable about an axis and defining a radial direction normal to the axis, the disk comprising:
      a plurality of slots distributed circumferentially about a radial outer periphery of the disk, wherein each slot includes an inner lobe pair disposed at the radially inboard end thereof, an outer lobe pair disposed radially outward from the inner lobe pair, and
      a front axial surface parallel to the radial direction; and
   a blade comprising:
      an airfoil; and
      a root joined with the airfoil and received within one of the plurality of slots, the root comprising:
         a LE axial surface parallel to the radial direction;
         a bottom lobe pair mated with the inner lobe pair of the disk; and
         a top lobe pair mated with the outer lobe pair of the disk;
   wherein an axial width of the disk conforms with an axial width of the root to define a variable rim width profile that includes a minimum rim width disposed between the bottom lobe pair and the outer periphery of the disk; and wherein the rim width profile increases from the top lobe pair to the bottom lobe pair; and wherein the rim width profile includes a radius at the minimum rim width and a linear portion tangent to the radius extending towards the bottom lobe pair; and wherein the linear portion forms an angle with the radial direction between thirty degrees and forty-five degrees.

5. The rotor assembly of claim 4, wherein the rim width profile increases from the minimum rim width to the bottom lobe pair.

6. The rotor assembly of claim 5, the blade further comprising a root neck section normal to the radial direction with a local minimum cross-sectional area, wherein the minimum rim width coincides with the root neck section.

7. The rotor assembly of claim 4, wherein the variable rim width profile includes a maximum rim width, and wherein the variable rim width profile increases from the minimum rim width radially inward to the maximum rim width profile.

8. The rotor assembly of claim 7, wherein the variable rim width profile includes a constant rim width portion radially inward from the maximum rim width.

9. A rotor assembly comprising:
a disk rotatable about an axis and defining a radial direction normal to the axis, the disk comprising:
a plurality of slots distributed circumferentially about a radial outer periphery of the disk, wherein each slot includes an inner lobe pair disposed at the radially inboard end thereof, an outer lobe pair disposed radially outward from the inner lobe pair, and
a front axial surface parallel to the radial direction; and
a blade comprising:
an airfoil; and
a platform joined to an inner end of the airfoil; and
a root joined with the platform and received within one of the plurality of slots, the root comprising:
a LE axial surface parallel to the radial direction; and
a bottom lobe pair mated with the inner lobe pair of the disk;
a top lobe pair mated with the outer lobe pair of the disk; and
a root neck section normal to the radial direction with a local minimum cross-sectional area and disposed between the bottom lobe pair and the platform;
wherein an axial width of the disk conforms with an axial width of the root to define a variable rim width profile that includes a minimum rim width coinciding with the root neck section; and
wherein the rim width profile increases from the top lobe pair to the bottom lobe pair; and
wherein the rim width profile includes a radius at the minimum rim width and a linear portion tangent to the radius extending towards the bottom lobe pair; and
wherein the linear portion forms an angle with the radial direction between thirty degrees and forty-five degrees.

10. The rotor assembly of claim 9, wherein the variable rim width profile includes a maximum rim width, and wherein the variable rim width profile increases from the minimum rim width radially inward to the maximum rim width profile.

11. The rotor assembly of claim 10, wherein the variable rim width profile includes a constant rim width portion radially inward from the maximum rim width.

* * * * *